United States Patent [19]

Adachi et al.

[11] 4,268,622
[45] May 19, 1981

[54] PHOTOGRAPHIC LIGHT-SENSITIVE MATERIALS HAVING DYED LAYERS

[75] Inventors: Keiichi Adachi; Eiichi Kato; Nobuaki Inoue; Tetsurou Kojima, all of Minami-ashigara, Japan

[73] Assignee: Fuji Photo Film Co., Ltd., Minami-ashigara, Japan

[21] Appl. No.: 105,167

[22] Filed: Dec. 19, 1979

[30] Foreign Application Priority Data

Dec. 26, 1978 [JP] Japan .................. 53-162627

[51] Int. Cl.$^3$ ................................. G03C 1/84
[52] U.S. Cl. ..................... 430/513; 430/518; 430/522
[58] Field of Search ............ 430/522, 518, 513

[56] References Cited

U.S. PATENT DOCUMENTS

| 3,384,487 | 5/1968 | Heseltine et al. | 430/522 |
|---|---|---|---|
| 3,423,207 | 1/1969 | Heseltine et al. | 430/522 |
| 3,481,927 | 12/1969 | Heseltine et al. | 430/522 |

*Primary Examiner*—Jack P. Brammer
*Attorney, Agent, or Firm*—Sughrue, Rothwell, Mion, Zinn and Macpeak

[57] ABSTRACT

A silver halide photographic light-sensitive material having on a support a hydrophilic colloidal layer containing a basic polymer, and at least one styryl or butadienyl dye represented by the following general formula (I) and having at least three sulfo groups in a dye molecule:

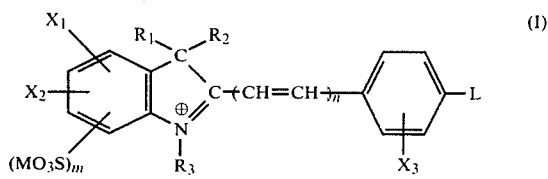

wherein $R_1$ and $R_2$, which may be the same or different, each represents an alkyl group; $R_3$ represents an unsubstituted or substituted alkyl or alkenyl group; L represents —O—Y—$SO_3$M or

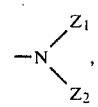

in which $Z_1$ and $Z_2$, which may be the same or different, each represents a hydrogen atom, an unsubstituted or substituted alkyl group, an alkenyl group, an unsubstituted or substituted aryl group, an acyl group or —Y—$SO_3$M, Y represents an alkylene or alkenylene group, and M represents a cation; $X_1$, $X_2$ and $X_3$, which may be the same or different, each represents a hydrogen atom, a halogen atom, an alkyl group, an alkoxy group, a hydroxy group, a carboxy group, a substituted amino group or an alkoxycarbonyl group; m is 0 or 1; and n is 1 or 2.

21 Claims, No Drawings

PHOTOGRAPHIC LIGHT-SENSITIVE MATERIALS HAVING DYED LAYERS

BACKGROUND OF THE INVENTION

1. Field of the Invention

The present invention relates to a novel photographic light-sensitive material having a hydrophilic colloidal layer dyed with a styryl or butadienyl dye. More particularly, the present invention relates to a silver halide photographic light-sensitive material having a hydrophilic colloidal layer dyed with a dye which can easily be discolored and removed during the photographic treatment, which does not have any detrimental effect on the spectral sensitivity of photographic emulsion layers.

2. Description of the Prior Art

Silver halide photographic light-sensitive materials often have emulsion layers and other hydrophilic colloidal layers colored in order to absorb light within specific wavelength ranges. When it is necessary to control the spectroscopic composition of the light falling upon the photographic light-sensitive layer, there is usually provided a colored layer in a position further removed from the base than the emulsion layer. This colored layer is called a filter layer. If there are a plurality of light-sensitive emulsion layers, a filter layer is sometimes positioned between the emulsion layers.

A colored layer called an anti-halation layer is often provided between a photographic emulsion layer and a film base, or on the opposite side of the base from the emulsion layer to prevent halation, i.e., a blurred effect caused when diffused light is reflected back through the emulsion layer, from the interface between the emulsion layer and the base or from the opposite surface of the light-sensitive material from the emulsion layer. If there are a plurality of emulsion layers, the anti-halation layer is sometimes disposed between the emulsion layers. A photographic emulsion layer is sometimes colored in order to prevent reduction in image sharpness caused by the diffusion of light through the emulsion layer (usually called irradiation).

These colored hydrophilic colloidal layers are usually colored by incorporating water-soluble dyes. These dyes must satisfy the following requirements:

(1) They must have the right spectral absorption for the intended purpose;

(2) They must be photochemically inert; namely, they must have no chemically adverse effects on the performance of the silver halide photographic emulsion layer such as reduction of sensitivity, degradation of the latent image, and fogging; and (3) They must be discolored or eluted into a treating solution or washing water during the photographic treatment, so that they may not leave any detrimental color on the photographic light-sensitive material which has been so-treated.

The requirement (2) above does not merely apply to the intrinsic sensitivity of silver halide, i.e., the light-sensitive property of silver halide in the absorption wavelength range specific thereto, but it also applies to its photographic characteristics at spectrally sensitized wavelength. In other words, the dyes used must satisfy the following requirements:

(a) They should not exert any spectral sensitizing effect on a photographic emulsion which should not be spectrally sensitized;

(b) They should not lower the degree of spectral sensitization of a photographic emulsion which has been spectrally sensitized;

(c) They should not bring about any shift in the maximum wavelength for spectral sensitization or create any new maximum wavelength for spectral sensitization; and (d) They should not affect other spectral sensitivity characteristics such as broadening or narrowing of the spectrally sensitized range.

Extensive efforts have been made by those skilled in the art to find dyes which satisfy the aforementioned requirements. These efforts have resulted in the discovery of, for example, oxonol dyes as disclosed in British Pat. Nos. 506,385 and 1,278,621, and U.S. Pat. Nos. 2,533,472, 3,247,127 and 3,379,533, hemioxonol dyes as typically disclosed in British Pat. No. 584,609, styryl dyes as typically disclosed in U.S. Pat. No. 2,298,733, merocyanine dyes as disclosed in U.S. Pat. No. 2,493,747, and cyanine dyes as typically disclosed in U.S. Pat. No. 2,843,486.

Most of the dyes which are discolored during the photographic emulsion processing steps are discolored by sulfites (or acid sulfites) contained in the development processing solution or by sulfites under alkaline conditions as described for example, in British Pat. No. 506,385.

If the colored layer is a filter layer or an antihalation layer disposed on the same side of the film base as the photographic emulsion layer often only that layer may be selectively colored and substantially no coloring effect should be exerted on any other layer. Failure to ensure this will not only exert a harmful spectral effect on the other layers, but also reduce the effectiveness of the layer as a filter or anti-halation layer. While a number of methods are available for the selective coloring of a specific hydrophilic colloidal layer, usually a hydrophilic polymer having an electric charge opposite to that of the dye ions is added to the hydrophilic colloidal layer as a mordant and caused to interact with the dye molecules (which interaction is considered to be mainly electrical attraction and also non-ionic or covalent bonding), whereby the dye is locally contained in the specific hydrophilic colloidal layer. Known examples of such a mordant include a polymer derived from an ethylene unsaturated compound having a dialkylaminoalkyl ester group as disclosed in British Pat. No. 685,475, a reaction product of a polyvinylalkylketone and an aminoguanidine as disclosed in British Pat. No. 850,281, and a polymer derived from 2-methyl-1-vinylimidazole as disclosed in U.S. Pat. No. 3,445,231. When mordanting with a polymer is employed, the contact of the dye containing layer with the other hydrophilic colloidal layers in a wet condition often results in diffusion of a part of the dye from the former layer to the latter. Such diffusion depends not merely on the chemical structure of the mordant used but also on that of the dye involved.

When a high molecular mordant of the aforementioned type is used, color is very likely to remain on the light-sensitive material after photographic treatment, particularly processing for a shortened time. This is presumably due to retention of a dye or a product of reversible discoloration in the layer containing the mordant, because the mordant still retains some power to combine with the dye even in an alkaline solution such as a developing solution, though such power is considerably reduced. This is also a problem which depends on the chemical structure of the mordant and particularly on the nature of the dye employed.

Among various water-soluble dyes, styryl and butadienyl dyes containing indolenines are known as useful dyes for dyeing a hydrophilic colloidal layer in a photographic light-sensitive material, because they are discolored in a developing solution containing a sulfite and do not leave any color on the light-sensitive material. Known examples of such dyes are those disclosed in U.S. Pat. Nos. 3,384,487 and 3,481,927. The dyes disclosed in these U.S. patents, however, contain only a maximum of two acid groups in one molecule, including one forming a quarternary ammonium salt (intramolecular) with a nitrogen atom in the indolenine nucleus. Use of a basic polymer as a mordant fails to provide sufficient mordanting because the dye molecule contains only one anionic site that contributes to mordanting and this makes it impossible to fully restrict diffusion of the dye into the layers containing no mordant.

Moreover, none of the dyes according to these U.S. patents is considered to be satisfactory in its "photochemical inertness against a silver halide photographic emulsion" which is an essential requirement for a photographic water-soluble dye. In other words, these dyes fail to satisfy the requirement that they do not spectrally sensitize any photographic emulsion which has not been spectrally sensitized, while they do not lower the degree of spectral sensitization of the emulsion which has been spectrally sensitized.

SUMMARY OF THE INVENTION

It is, therefore, an object of the present invention to provide a photographic light-sensitive material having a hydrophilic colloidal layer containing a water-soluble dye which can be discolored during photographic treatment and which will not have any adverse effect on the photographic properties of a photographic emulsion, particularly its spectral sensitivity.

It is another object of the present invention to provide a silver halide photographic light-sensitive material in which the dyeing is restricted to the hydrophilic colloidal layer containing a basic polymer.

It is a further object of the present invention to provide a photographic light-sensitive material comprising a hydrophilic colloidal layer containing a dye which will not leave color after photographic treatment, even if at least one hydrophilic colloidal layer composing the light-sensitive material contains a basic polymer.

These objects of the present invention have been attained with a silver halide photographic light-sensitive material in which at least one hydrophilic colloidal layer on a film base contains a basic polymer and at least one styryl or butadienyl dye represented by the following general formula (I), and comprising an indolenine nucleus having at least three sulfo groups in the dye molecule:

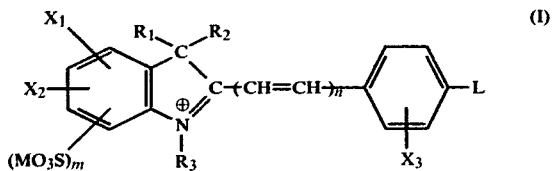

wherein $R_1$ and $R_2$ may be the same or different and represent an alkyl group preferably having 1 to 5 carbon atoms; $R_3$ represents an alkyl group preferably having 1 to 6 carbon atoms, a substituted alkyl group preferably having 1 to 8 carbon atoms (in which the substituent may, for example, be a sulfo group, a carboxy group, a hydroxy group, a cyano group, or an alkoxy group preferably having 1 to 4 carbon atoms), or an alkenyl group preferably having 2 to 5 carbon atoms. L represents $—O—Y—SO_3M$, or

in which $Z_1$ and $Z_2$ may be the same or different, and represent a hydrogen atom, an unsubstituted or substituted alkyl group preferably having 1 to 8 carbon atoms (in which the substituent may, for example, be a halogen atom, a hydroxy group, a cyano group, an alkoxy group, an acylamino group, an alkylamino group, a dialkylamino group, a sulfo group, or an aryl group), an alkenyl group having preferably 2 to 6 carbon atoms, an unsubstituted or substituted aryl group [preferably an unsubstituted or substituted phenyl group] (in which the substituent may, for example, be a halogen atom, a sulfo group, a hydroxy group, an alkoxy group having preferably 1 to 4 carbon atoms, or an alkyl group having preferably 1 to 4 carbon atoms), an acyl group derived from an aliphatic carboxylic or sulfonic acid preferably having 1 to 6 carbon atoms, or $—Y—SO_3M$; Y represents an alkylene or alkenylene group preferably having 2 to 6 carbon atoms; and M represents a hydrogen atom, an ammonium ion, an alkali metal cation, an alkali earth metal cation or a cation of an organic base. $X_1$, $X_2$ and $X_3$ may be the same or different, and represent a hydrogen atom, a halogen atom, an alkyl group preferably having 1 to 6 carbon atoms, an alkoxy group preferably having 1 to 6 carbon atoms, a hydroxy group, a carboxy group, a substituted amino group (more specifically, an amino group substituted by an acyl group derived from an aliphatic carboxylic or sulfonic acid preferably having 1 to 6 carbon atoms, an alkylamino group preferably having 1 to 6 carbon atoms, a dialkylamino group preferably having 1 to 6 carbon atoms, or the like), or an alkoxycarbonyl group preferably having 2 to 6 carbon atoms; m is 0 or 1; and n is 1 or 2.

DETAILED DESCRIPTION OF THE INVENTION

In the formula (I), $R_1$ and $R_2$ may be the same or different, and represent an alkyl group having preferably 1 to 5 and most preferably 1 to 3 carbon atoms (e.g., methyl, ethyl or n-propyl); and $R_3$ represents an alkyl group having preferably 1 to 6 carbon atoms and more preferably 1 to 5 carbon atoms (e.g., methyl, ethyl, n-propyl or n-butyl), a substituted alkyl group having a total of 1 to 8 and preferably 1 to 6 carbon atoms (e.g., 2-sulfoethyl, 3-sulfopropyl, 4-sulfobutyl, 3-sulfobutyl, 3-carboxypropyl, 4-carboxybutyl, 2-hydroxyethyl, 3-hydroxypropyl, 2-cyanoethyl, 4-cyanobutyl, 3-methoxypropyl, or 3-ethoxypropyl), or a straight chain or branched chain alkenyl group having 2 to 5 and preferably 2 to 4 carbon atoms (e.g., 2-propenyl). In accordance with one embodiment of the invention $R_3$ contains a sulfo group, e.g., a sulfoalkyl group.

When L represents $—O—Y—SO_3M$, Y represents a straight chain or branched chain alkylene group having 2 to 5 carbon atoms (e.g., ethylene, propylene or butylene), or an alkenylene group having 2 to 5 carbon atoms (e.g., ethenylene or 2-propenylene). When L represents

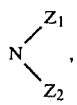

$Z_1$ and $Z_2$ may be the same or different, and represents a hydrogen atom, an unsubstituted or substituted alkyl group having 1 to 6 carbon atoms [e.g., methyl, ethyl, n-propyl, i-propyl, 2-cyanoethoxyethyl, 2-sulfoethyl, sulfopropoxyethyl, 4-sulfobutyl, 2-chloroethyl, 3-chloropropyl, 4-chlorobutyl, 2-hydroxyethyl, 3-hydroxypropyl, 2-cyanoethyl, 2-methoxyethyl, 2-ethoxyethyl, 2-methanesulfonylaminoethyl, 2-(N-methylamino)ethyl, 2-(N,N-dimethylamino)ethyl, 2-(N-ethylamino)ethyl, 3-sulfopropyl or 3-sulfophenylmethyl], an alkenyl group having 2 to 4 carbon atoms (e.g., vinyl or 2-propenyl), an unsubstituted or substituted phenyl group (e.g., a phenyl group, 4-sulfophenyl, 3-sulfophenyl, 4-chlorophenyl, 4-hydroxyphenyl, 4-methoxyphenyl, 4-ethoxyphenyl, 4-methylphenyl or 2-methylphenyl), an acyl group derived from an aliphatic carboxylic or sulfonic acid having 1 to 4 carbon atoms (e.g., acetyl, propionyl, methanesulfonyl or ethanesulfonyl), or —Y—SO$_3$M in which Y is as defined above. L is preferably a

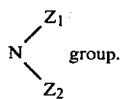 group.

M represents a cation of a hydrogen atom, an ammonium ion, an alkali metal cation (e.g., sodium or potassium), an alkaline earth metal cation (e.g., calcium or barium), or a cation derived from an organic base [e.g., cations of trimethylamine, triethylamine, tri(n-butyl)amine, pyridine or morpholine].

$X_1$, $X_2$ and $X_3$ may be the same or different, and represent a hydrogen atom, a halogen atom (e.g., a chlorine or bromine atom), an alkyl group having 1 to 4 carbon atoms (e.g., methyl, ethyl or n-propyl), an alkoxy group having 1 to 4 carbon atoms (e.g., methoxy, ethoxy, sulfopropoxy or n-butoxy), a hydroxy group, a carboxy group, an amino group substituted by an acyl group derived from an aliphatic carboxylic or sulfonic acid having 1 to 4 carbon atoms (e.g., acetylamino, propionylamino, methanesulfonylamino, ethanesulfonylamino or 3-sulfopropionylamino), an alkylamino group having 1 to 4 carbon atoms (e.g., methylamino, ethylamino or n-propylamino), dialkylamino group having a total of 1 to 4 carbon atoms (e.g., dimethylamino or diethylamino), or an alkoxycarbonyl group having 2 to 4 carbon atoms (e.g., methoxycarbonyl or ethoxycarbonyl).

The aforementioned alkyl groups which may be straight or branched chain (including the alkyl portions in the substituted alkyls) and alkylene groups include branched ones. The numbers of carbon atoms as specified herein are preferred. n can be either 1 or 2, but is preferably 1 from the standpoint of synthesis. The aforementioned L or $X_3$ should preferably contain at least one sulfo group. Moreover, it is preferable that any sulfo group contained in a compound of the general formula (I) be in the form of a salt.

Of the dyes of formula (I) styryl dyes are preferred. Specific examples of the dyes used in the present invention are shown hereunder but these examples should not be construed as limiting the scope of the present invention in any way.

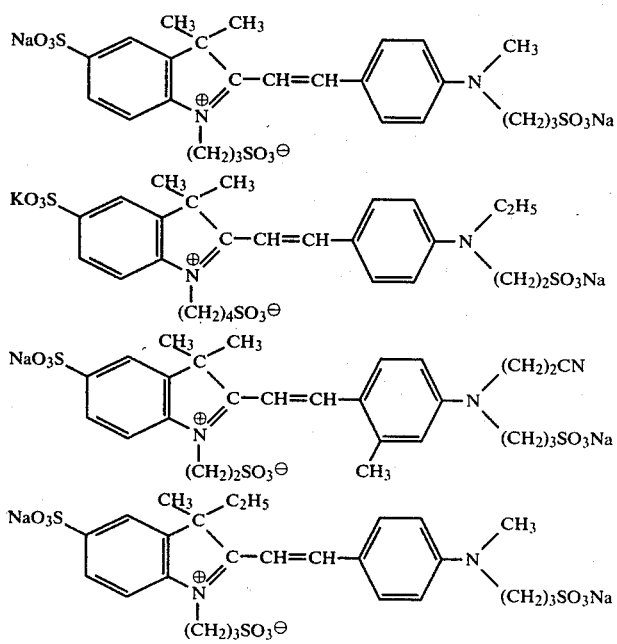

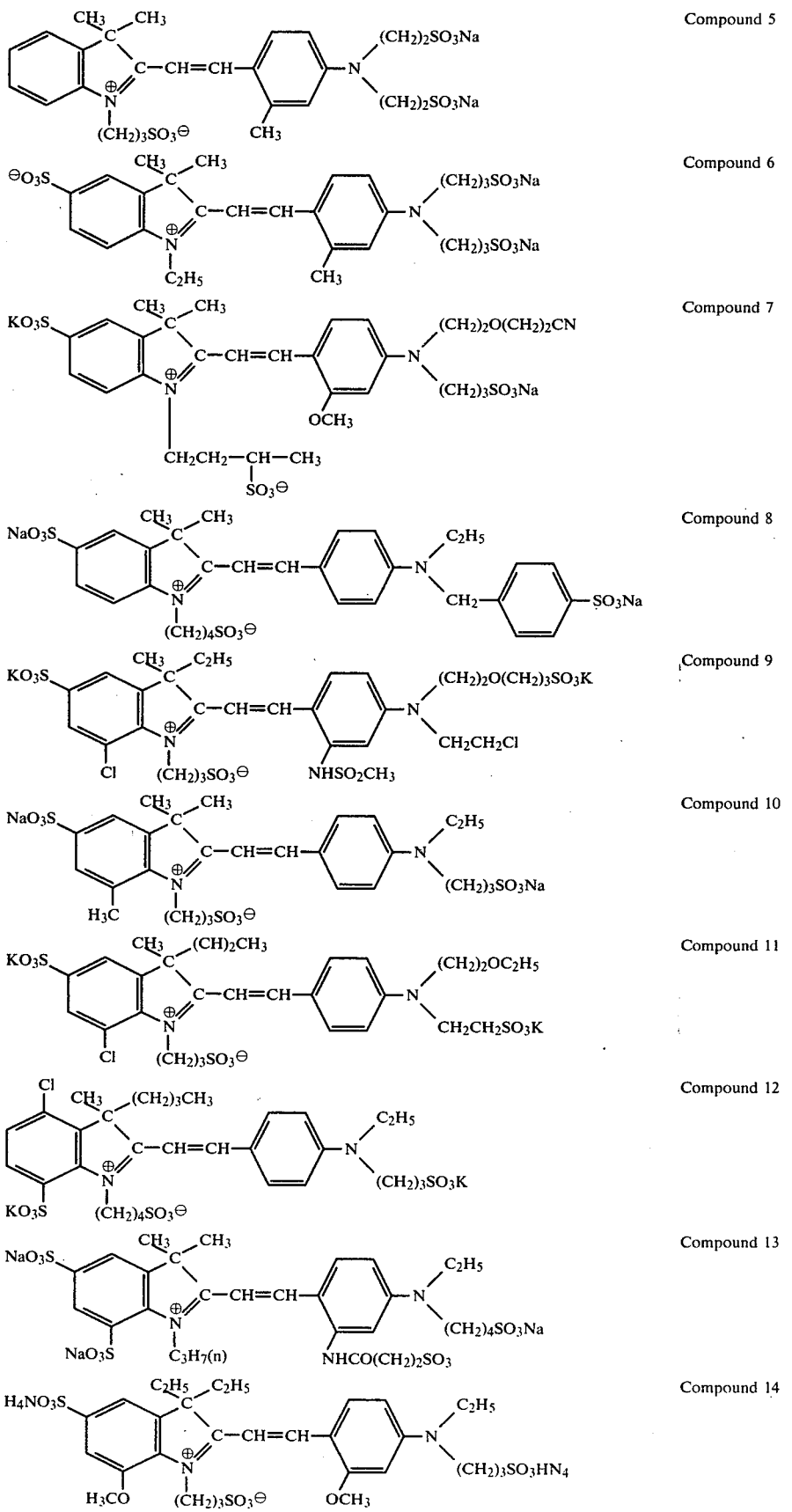

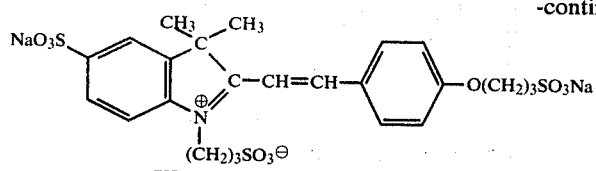
Compound 15

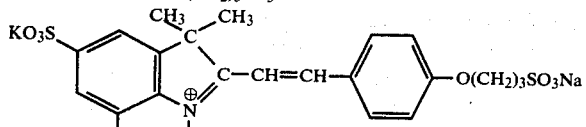
Compound 16

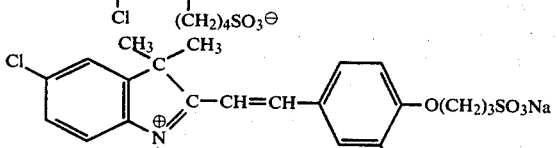
Compound 17

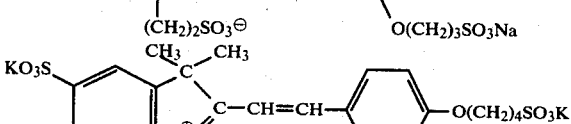
Compound 18

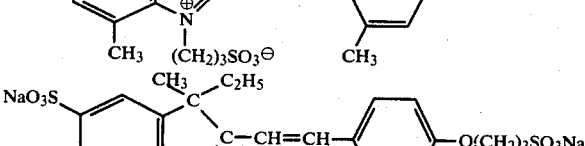
Compound 19

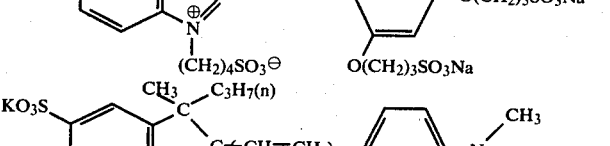
Compound 20

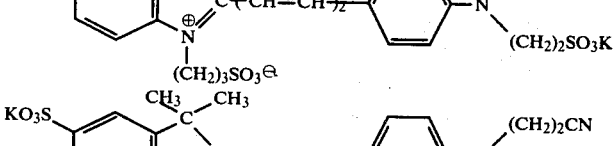
Compound 21

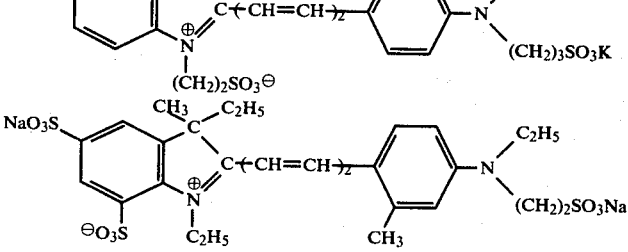
Compound 22

Each of the styryl and butadienyl dyes represented by the formula (I) can be prepared by condensation of an aldehyde compound represented by the following formula (II) and an indolenine quaternary ammonium salt represented by the following formula (III):

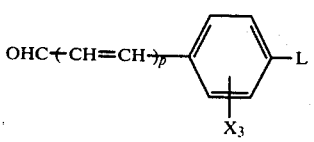
(II)

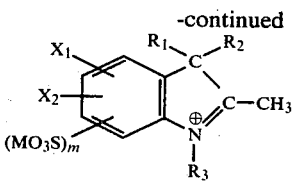
(III)

wherein $R_1$, $R_2$, $R_3$, $X_1$, $X_2$, $X_3$, L, m and M are all defined as in formula (I), and p is 0 or 1. The compound of the formula (III) forms an intramolecular salt.

The condensation reaction is advantageously carried out using a solvent which can dissolve at least one of the compounds of the formulae (II) and (III), or a reaction product thereof. Suitable solvents include alcohols (e.g., methanol, ethanol and isopropyl alcohol), ethylene glycol monoalkyl ethers (e.g., ethylene glycol monomethyl ether), amides (e.g., acetamide and dimethylformamide), dimethyl sulfoxide, and acetonitrile. These solvents can be used individually or as a mixture. Although there is no limitation in particular on the amount of any of these solvents used for the reaction, it is suitable to use approximately 2 to 50 times more solvent by weight than the compound of the formula (III).

The reaction may be carried out at room temperature or up to the boiling point of the solvent used. The reaction time is preferably in the range of approximately 0.5 to 6 hours. It is advantageous to add a lower carboxylic acid such as acetic acid and propionic acid to promote the reaction. It is suitable to use such an acid in the amount of not more than 10% by weight of the solvent used. It is preferable to use from 1 to about 2 moles of the aldehyde compound of the formula (II) per mole of the indolenine quaternary ammonium salt represented by the formula (III).

The aldehyde represented by the formula (II) can be synthesized from the corresponding anilines and phenols (p=0 in the formula (II)) or substituted benzaldehydes (p=1 in the formula (II)) by formylation as described in British Pat. No. 1,466,440, using a formylation agent consisting of dimethylformamide and oxychlorophosphate (as disclosed in Ber. 60, 119 ('27) as Vilsmeier-Haak Reaction; using hexamethylenetetramine/formaldehyde/fatty acid (as described in British Pat. No. 794,885); and also as described in Ber. 96. 308 ('63) or J. Chem. Soc., 1945, 276. The Strecker reaction described in Japanese Patent Application (OPI) 101325/75 can be used as the effective method for synthesizing the aldehyde compound containing a sulfo group.

The indolenine quaternary ammonium salt represented by the formula (III) can be synthesized by quaternizing the corresponding indolenines in the presence of the quaternizing agent using dialkyl sulfates, alkyl tosylates or alkyl halides as the quaternizing agent as described in U.S. Pat. No. 2,503,776, Tetrahedron Letters 1964, 803–804 or Japanese Patent Application (OPI) 76866/75; using sultones (for example, propane sultone, butane sultone, etc. as quaternizing agents as described in U.S. Pat. No. 2,895,955, Biomedicine 20 231–241 ('74), (Chem. Ab. 82, 121255P) or German Pat. No. 2,517,143. Further, the indolenines can be synthesized in accordance with indole-synthesis of Fischer described in J. Org. Chem. 33, 4283 ('68) or ibid. 22, 1703 ('57).

Description will now be made of typical examples of synthesis of the dyes employed in the present invention.

Synthesis Example 1

Synthesis of Compound 1

A mixture consisting of 26.5 g of 4-[N-methyl-N-(2-sulfoethyl)]aminobenzaldehyde, 31.0 g of anhydro 1,1,2-trimethyl-3-(3-sulfonatopropyl)-6-sulfoindolenium hydroxide, 500 ml of methanol and 10 ml of glacial acetic acid was heated under reflux over a bath of hot water for one hour. A solution containing 20 g of anhydrous potassium acetate as a salt forming agent in 100 ml of methanol was added to mixture, and the resulting mixture was refluxed over a period of five minutes, whereby a reddish brown precipitate was formed. The reaction solution was cooled to 25° C., and the crystals were collected by filtration. The crystals were recrystallized from a mixed solvent containing methanol and ethanol in the ratio by volume of 1 to 2 to yield 30 g of green crystals. An aqueous solution of the dye thus obtained presented a red color and showed a maximum absorption wavelength of 566 nm.

SYNTHESIS EXAMPLE 2

Synthesis of Compound 5

A mixture consisting of 38 g of 2-methyl-4-[N,N-di(2-sulfoethyl)]aminobenzaldehydedisodium salt, 28.1 g of anhydro 1,1,2-trimethyl-(3-sulfonatopropyl)-indolenium hydroxide, 800 ml of methanol and 10 ml of glacial acetic acid was heated under reflux over a bath of hot water for a period of 1.5 hours. Then, a solution containing 9 g of anhydrous sodium acetate in 50 ml of methanol was added to the mixture, the resulting mixture was refluxed over a period of five minutes, and the reaction solution was concentrated to 400 ml. After the solution was allowed to stand overnight, reddish brown crystals were precipitated. The crystals were collected by filtration and recrystallized from a mixed solvent containing methanol and ethanol in the ratio by weight of 1:1 to yield 31.5 g of green crystals. An aqueous solution of the dye thus obtained presented a red color and showed a maximum absorption wavelength of 538 nm.

SYNTHESIS EXAMPLE 3

Synthesis of Compound 10

A mixture consisting of 13.6 g of 4-[N-ethyl-N-(3-sulfopropyl)]aminobenzaldehyde, 18.3 g of anhydro 1,1,2,4-tetramethyl-3-(3-sulfonatopropyl)-6-sulfoindolenium hydroxide, 400 ml of methanol and 5 ml of glacial acetic acid was heated under reflux over a bath of hot water for a period of one hour. Then, a solution containing 10 g of anhydrous potassium acetate in 80 ml of methanol was added to the mixture for refluxing over a period of five minutes and the reaction solution was concentrated to 200 ml. After the solution was allowed to stand at about 5° C. overnight, reddish brown crystals were precipitated, and they were collected by filtration. The crystals were recrystallized from ethanol to yield 12.5 g of green crystals. An aqueous solution of the dye thus obtained presented a reddish brown color and showed a maximum absorption wavelength of 555 nm.

SYNTHESIS EXAMPLE 4

Synthesis of Compound 20

A mixture consisting of 14.7 g of 4-[N-methyl-N-(2-sulfoethyl)amino]cinnamaldehyde, 23.1 g of anhydro 1,1,2-trimethyl-3-(4-sulfonatobutyl)-6-sulfoindolenium hydroxide triethylamine salt, 400 ml of methanol and 5 ml of glacial acetic acid was heated under reflux over a bath of hot water for a period of one hour. Then, a solution containing 10 g of anhydrous potassium acetate in 80 ml of methanol was added to the mixture, and after refluxing over a period of five minutes, the reaction solution was concentrated to 200 ml. After the solution was allowed to stand overnight, the precipitated dark violet crystals were collected by filtration and recrystallized from ethanol to yield 11 g of dark violet crystals. An aqueous solution of the dye thus obtained presented a blue color and showed a maximum absorption wavelength of 647 nm.

SYNTHESIS EXAMPLE 5

Synthesis of Compound 15

A mixture consisting of 13.9 g of 4-(3-sulfopropoxy) benzaldehyde, 16.5 g of anhydro 1,1,2-trimethyl-3-(3-sulfonatopropyl)-6-sulfoindolenium hydride, 200 ml of methanol and 5 ml of glacial acetic acid was heated under reflux over a bath of hot water for a period of 1.5 hours. Then, a solution containing 5 g of anhydrous potassium acetate in 80 ml of methanol was added to the mixture, and after refluxing over a period of five minutes, the solution was allowed to stand overnight. The precipitated yellow crystals were collected by filtration and recrystallized from a mixed solvent containing methanol and ethanol in the ratio by weight of 1:1 to yield 12.5 g of yellow crystals. An aqueous solution of the dye thus obtained presented a yellow color and showed a maximum absorption wavelength of 453 nm.

These dyes can be incorporated in an ordinary manner into a hydrophilic colloidal layer on the photographic light-sensitive material of the present invention. An aqueous solution containing a suitable concentration of a dye may be added to an aqueous solution of hydrophilic colloids and the resulting mixed solution may be coated in a known manner on a film base or any other layer forming the photographic light-sensitive material. The amount of the dye added to the aqueous solution of hydrophilic colloid may suitably be selected to suit the intended purpose, subject to the solubility of the dye involved. It is however, generally practical to prepare an aqueous solution containing 0.5 to 3.0% of a dye and to apply it to the photographic light-sensitive material so that there are 8 to 800 mg of the dye per square meter of the surface area of the material.

The dye applied to the light-sensitive material of the present invention is advantageously incorporated into a coating solution for a hydrophilic colloidal layer containing a basic polymer but can also be added to a coating solution for any other hydrophilic colloidal layer, for instance, a photographic emulsion layer or any other layer adjacent thereto. In the latter case, it is desirable to incorporate the dye into a layer which is as close to the basic polymer containing layer as possible, and preferably immediately adjacent thereto. If the dye is incorporated into a layer not containing the basic polymer, it diffuses into a layer containing a basic polymer and is concentrated therein to eventually cause the basic polymer containing layer to be selectively dyed in the light-sensitive material. The dye can be incorporated into more than one layer.

The basic polymer may be incorporated into one or more hydrophilic colloidal layers which may be disposed on the side of the photographic emulsion layer removed from the film base, or if there are a plurality of emulsion layers, the basic polymer containing layer may be disposed between the emulsion layers, or between the emulsion layers and the base. The position of the layer or layers selectively dyed with the aid of the basic polymer incorporated therein depends on its or their function in the light-sensitive material, and can be either as a filter layer, or an anti-halation layer, or any other purpose.

The light-sensitive material of the present invention contains a basic polymer in at least one hydrophilic colloidal layer. Useful basic polymers which can be used include, for example, a basic and hydrophilic high polymer which contains a basic residue having a tertiary or quaternary nitrogen atom in its main or side chain and which is usually employed for mordanting an acid dye in a hydrophilic colloidal layer in a silver halide photographic light-sensitive material.

These polymers may have a polymerization degree of approximately 1,000 to 1,000,000, preferably 5,000 to 1,000,000, and more particularly, 10,000 to 200,000. Typical examples of these polymers are a polymer obtained by the polymerization of an ethylenically unsaturated compound containing a dialkylaminoalkylester group such as diethylaminoethyl methacrylate as disclosed in U.S. Pat. No. 2,675,316; a copolymer of such a polymer and, for example, acrylamide as disclosed in U.S. Pat. No. 2,839,401; a basic polymer or maleinimide derivative synthesized from maleinimide, or a copolymer thereof with, for example, styrene as disclosed in U.S. Pat. Nos. 3,016,306 and 3,488,706; a polymer containing a 2-methylimidazole nucleus in its side chain as disclosed in U.S. Pat. No. 3,445,231; an addition polymer of bisacrylamide and a secondary diamine, or a quaternary salt thereof as disclosed in U.S. Pat. No. 3,795,519; a polymer containing polyvinyl pyridine or quinoline as disclosed in British Pat. No. 765,520 and U.S. Pat. No. 2,721,852; and a polymer as disclosed in U.S. Pat. No. 3,624,229 and West German Patent Application (OLS) No. 1,914,362. For the purpose of the present invention, it is desirable to use the polymer disclosed in U.S. Pat. No. 2,675,316. It is also possible to use a polymer obtained by the reaction between polyvinylalkylketone (e.g., polyvinylmethylketone) or an aldehyde (e.g., polyacrolein) and aminoguanidine as disclosed in U.S. Pat. No. 2,882,156. The present invention does not, however, essentially require any such polymer combination as disclosed in U.S. Pat. No. 3,282,699, but may effectively use various other polymers as mentioned above to thereby produce satisfactory results.

The proportion of the basic mordanting polymer used relative to the styryl or butadienyl dye employed in the light-sensitive material of the present invention may, for example, be so selected that there are 1 to 5 equivalents of recurring units forming the polymer per equivalent of the acid group in the dye. It is, however, possible to incorporate the polymer and the dye in any other appropriate proportion.

The hydrophilic colloidal layers of the light-sensitive material according to the present invention do not merely contain hydrophilic colloids, a dye and a mordant, but may also contain various additives for improving the properties of the photographic light-sensitive material such as a hardening agent, a coating assistant, a plasticizer, a slipping agent, matting agent, emulsion polymerized latex, an antistatic agekt, an ultraviolet ray absorbing agent and an oxidation inhibitor.

The photographic emulsion layer of the photographic light-sensitive material according to the present invention may contain any silver halide such as silver bromide, silver iodobromide, silver chloroiodobromide, silver chlorobromide and silver chloride.

Gelatin may advantageously be used as a binder or protective colloid for the photographic emulsion but other hydrophilic colloids can also be employed. Useful examples of such other binders include proteins such as gelatin derivatives, graft polymers of gelatin and other high polymers, albumin and casein; cellulose derivatives such as hydroxyethyl cellulose and carboxymethyl cellulose; sugar derivatives such as agar, sodium alginate and starch derivatives; and various synthetic hydrophilic high molecular materials such as polyvinyl alcohol-hemiacetal, poly-N-vinyl pyrrolidone, polyacrylic acid, polyacrylamide, polyvinylimidazole and polyvinylpyrazole, or copolymers thereof.

Examples of useful gelatins include acid treated gelatin, and hydrolytic or enzymatic reaction products of gelatin, in addition to lime treated gelatin. Gelatin derivatives may be obtained by reacting gelatin with, for example acid halide, acid anhydride, acid esters, isocyanate, bromoacetic acid, alkanesartones, vinylsulfonamides, maleimide compounds, polyalkyleneoxide compounds, or epoxy compounds. Specific examples of these gelatin derivatives include those disclosed in U.S. Pat. Nos. 2,614,928, 2,763,639, 3,118,766, 3,132,945, 3,186,846 and 3,312,553, British Pat. Nos. 861,414, 1,005,784 and 1,033,189, and Japanese Patent Publication No. 26,845/67.

The aforementioned graft polymers of gelatin can be prepared by graft polymerizing gelatin with homo- or copolymers of vinyl monomers such as acrylic acid, methacrylic acid, or their derivatives such as esters and amides, acrylonitrile, and styrene. Particularly suitable graft polymers are those of gelatin with polymers having certain compatibility with gelatin, such as acrylic acid, methacrylic acid, acrylamide, methacrylamide and hydroxyalkyl methacrylate. Examples of these graft polymers are disclosed in U.S. Pat. Nos. 2,763,625, 2,831,767 and 2,956,884.

Useful synthetic hydrophilic high molecular materials are, for example, shown in West German Patent Application (OLS) No. 2,312,708 and U.S. Pat. No. 3,879,205.

Chemically sensitized silver halide emulsions are usually used, though it is also possible to use 'primitive' emulsions which are not chemically sensitized. Chemical sensitization can be performed using the method described in P. Glafkides' "Photographic Chemistry" (Paul Montel, 1958), or "Die Grundlagen der photographischen Prozesse mit Silberhalogeniden Prozesse (Akademische Verlagsgesellschaft, 1968) edited by H. Frieser. In other words, it is possible to use individually or in combination sulfur sensitization in which active gelatin or a sulfur containing compound capable of reacting with silver ions is employed, reduction sensitization in which a reducing substance is employed, and noble metal sensitization in which gold and other noble metals are employed.

The photographic emulsions used in the present invention can be spectrally sensitized with methine dyes or the like. Useful dyes include cyanine, merocyanine, complex cyanine, complex merocyanine, holopolar cyanine, hemicyanine, styryl and hemioxonol dyes. Cyanine, merocyanine and complex merocyanine dyes are particularly suitable. These dyes may contain any of the nuclei usually used in the cyanine dyes as basic isomer ring nuclei. These nuclei are, for example, pyrroline, oxazoline, thiazoline, pyrrole, oxazole, thiazole, selenazole, imidazole, tetrazole and pyridine; any of these nuclei to which an alicyclic hydrocarbon ring is linked; and any of these nuclei to which an aromatic hydrocarbon ring is linked such as indolenine, benzindolenine, indole, benzoxazole, naphthoxizale, benzthiazole, naphthothiazole, benzoselenazole, benzimidazole and quinoline. These nuclei may be substituted at the carbon atoms.

The merocyanine or complex merocyanine dyes may contain nuclei having a ketomethylenic 5- or 6-membered heterocyclic ring nuclei such as pyrazoline-5-one, thiohydantoin, 2-thiooxazolidine-2, 4-dione, rhodanine and thiobarbituric acid.

Useful sensitizing dyes are, for example, those disclosed in German Pat. No. 929,080, U.S. Pat. Nos. 2,231,658, 2,493,748, 2,503,776, 2,519,001, 2,912,329, 3,656,959, 2,672,897 and 3,694,217, British Pat. No. 1,242,588, and Japanese Patent Publication No. 14,030/69. These sensitizing dyes can be used either individually or in combination. Combinations of sensitizing dyes are often employed particularly for supersensitization. Typical examples of such combinations are disclosed in U.S. Pat. Nos. 2,688,545, 2,977,229, 3,397,060, 3,522,052, 3,527,641, 3,617,293, 3,628,964, 3,666,480, 3,679,428, 3,703,377, 3,769,301, 3,814,609 and 3,837,862, British Pat. No. 1,344,281, and Japanese Patent Publication No. 4936/68. In addition to a sensitizing dye, the emulsion may also contain a dye having no spectral sensitizing action itself, or a material which does not absorb substantially any visible rays, but is capable of supersensitization.

The photographic emulsion layers may contain various compounds for preventing fogging or stabilizing the photographic performance of the light-sensitive material during the preparation, storage or photographic treatment thereof. A number of compounds useful as such anti-fogging agents or stabilizers are known, including azoles such as benzothiazolium salts, nitroindazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles, and mercaptotetrazoles; mercaptopyrimidines; mercaptotriazines; thioketo compounds such as oxazolinethion; azaindenes such as triazaindenes, tetrazaindenes, particularly 4-hydroxy-(1, 3, 3a, 7)tetrazaindene, and pentazaindenes; and benzenethiosulfonic acid, benzenesulfinic acid and benzenesulfonic acid amides.

The photographic emulsion layer of the light-sensitive material according to the present invention may optionally contain the usual non-diffusible color image forming coupler. The color image forming coupler is a compound which reacts with the oxidation product of an aromatic primary amine developing agent to form a dye during the photographic developing treatment. The coupler may be either 4- or 2-equivalent coupler. The emulsion layer can also contain a colored coupler for color correction and a coupler releasing a development inhibitor (DIR coupler). An open-chain ketomethylene type compound such as an acylaminoacetamide type compound is useful as a yellow color forming coupler, a pyrazolone or cyanoacetyl type compound as a magenta color coupler, and a naphthol or phenol type compound as a cyan color coupler. Couplers can be incorporated into an emulsion layers in a known manner. For example, the coupler can be dispersed in a hydrophilic colloid together with a high boiling organic solvent such as an ester of an aliphatic compound, an alkyl ester of an aromatic carboxylic acid, an aromatic ester of phosphoric acid and an aromatic ether, or it can be incorporated into a hydrophilic colloid as an aqueous alkaline solution thereof.

The photographic emulsion is coated on a base or support ordinarily used in a photographic light-sensitive material, such as a flexible support made of plastic film, paper or cloth, or a rigid support made of glass, ceramic or metal. Suitable flexible supports include films of semisynthetic or synthetic high molecular materials such as cellulose nitrate, cellulose acetate, cellulose acetate butyrate, polystyrene, polyvinyl chloride, polyethylene terephthalate and polycarbonate, and coated or laminated paper prepared by applying baryta or α-olefin polymers such as polyethylene, polypropylene and an ethylene-butene copolymer.

The present invention is also applicable to a multilayer multicolor photographic material having at least two layers of different spectral sensitivity on a support. The multilayer natural color photographic light-sensitive material usually carries at least one of each of a red-sensitive, green-sensitive and blue-sensitive halide emulsion layer on a support. These layers can be arranged in any order as required. It is usual practice to incorporate a cyan color forming coupler into the red-sensitive emulsion layer, a magenta color forming coupler into the green-sensitive emulsion layer and a yellow color forming coupler into the blue-sensitive emulsion layer, though any other combination of emulsion layers and couplers may be used for the effect desired.

According to the present invention, the filter layer, the anti-halation layer or any other hydrophilic colloidal layer dyed for a different purpose possesses a sufficiently large absorption density, even if its layer thickness is reduced to a minimum to maintain a high resolving power. This is because the dyes used in the present invention are highly soluble in water and compatible with gelatin.

The light-sensitive material of the present invention particularly its dyed layers, are easily discolored during the photographic treatment thereof and no color remains on the light-sensitive material after it has been processed. The photographic treating solution does not undergo any contamination by the dyes.

In the light-sensitive material of the present invention, dyes are incorporated into hydrophilic colloidal layers and do not exert any detrimental effect on the photographic properties of the photographic emulsion layer. The sensitivity or gradation of the photographic emulsion layer is not reduced or weakened in any way other than under the filter effect of the dyed layer itself in case the dyed layer is closer to a light source than the emulsion layer is, and no fogging occurs. This is true with the photographic properties of the light-sensitive material both in the sensitive wavelength region specific to the silver halide and in a color sensitized region. No such detrimental effect appears in the light-sensitive material with the lapse of time after its manufacture.

According to the present invention, the dye is fixed only in the layer containing a basic polymer, and does not diffuse into any other layer. Therefore, the present invention provides a photographic light-sensitive material having superior spectral and other photographic properties in which the sensitivity or gradation of the photographic emulsion layer does not undergo any unexpected reduction that would otherwise by caused by the undesirable spectral effect due to the diffusion of the dye. The present invention is particularly advantageous when applied to black-and-white and color photographic light-sensitive materials as an anti-halation layer between a photographic emulsion layer and a support, and a color photographic light-sensitive material having at least three photographic emulsion layers, and provided between those emulsion layers with a filter layer which may optionally serve as an anti-halation layer as well.

If there is any diffusion of a dye from the layer dyed therewith to an emulsion layer disposed thereabove and spaced farther from the support, or into a still higher hydrophilic colloidal layer, the emulsion layer is subjected to the filter effect of the dye and reduces its sensitivity and weakens its gradation in the wavelength region of the light absorbed by the dye. No such diffusion of the dye occurs to the light-sensitive material of the present invention, but the emulsion layer(s) disposed on the opposite side of the dyed layer from the support only undergo a substantially negligible reduction in sensitivity. The reduction of its sensitivity does not exceed 0.06 with respect to the logarithmic exposure amount.

The present invention and its advantages will now be described in further detail with reference to the following experiments and examples.

EXPERIMENT

Experiments were conducted with respect to Compound 1 of the present invention as mentioned above and comparative dyes A and B represented by the following formulae, respectively, in order to obtain the coefficient of diffusion of each dye in gelatin and the coefficient of diffusion from a gelatin phase containing a basic polymer to a gelatin phase containing no such polymer:

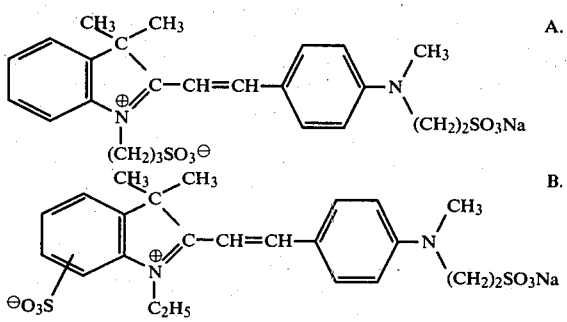

(i) Determination of the Coefficients of Diffusion of Dyes in Gelatin

An aqueous solution of each dye and gelatin containing 10 g of gelatin and $2 \times 10^{-4}$ mole of the dye in 100 cc was prepared. A cylindrical cell having a diameter of 1.5 cm and a volume of 10 cc was filled with 10 cc of the solution, and after another cylinder of equal size was superposed on the cell, an aqueous solution containing 10% gelatin was added to the cylinder and the mixed solution was allowed to stand at 25° C. for 4 hours. The upper cylinder was then separated from the lower cell, gelatin gel was removed from the upper cylinder, and after the gel was dissolved into a uniform solution, its spectral absorption was determined. Another sample allowed to stand for 16 hours was also tested. In this way, the amount of diffusion was determined for each dye, and the coefficient D of its diffusion in gelatin was obtained in accordance with the following Fick's formula:

$$D = \frac{m^2 \pi}{C_o q^2 t} \; [\text{cm}^2/\text{sec}]$$

wherein m represents the amount of diffusion of the dye; $C_o$ represents the initial concentration of the dye, q represents the cross-sectional area, and t represents time.

(ii) Determination of the Coefficients of Diffusion of Dyes from a Phase Containing a Basic Polymer A solution containing each dye was prepared by adding $2\times 10^{-4}$ mole of the dye in the form of an aqueous solution into 80 cc of an aqueous solution containing 10 g of gelatin and 7 cc of a 5% aqueous solution of poly[($\beta$-diethylaminoethyl) methacrylate] having a molecular weight of about 70,000. The 5% polymer solution had a pH of 5.6. The amount of diffusion of each dye was dtermined at 25° C. using 10 cc of the solution and repeating the procedure described in (i) above after the solution was allowed to stand for 16 and 24 hours, respectively. The 10% gelatin solution filling the upper cell merely contained 2.5% by weight of sodium dodecylbenzenesulfonate.

The results of experiments (i) and (ii) are shown in Table 1 below.

TABLE 1

| Dye | Coefficient of Diffusion ($cm^2$/sec) | |
|---|---|---|
|  | (i) In Gelatin | (ii) In Gelatin and Mordant |
| Example Dye 1 | $2.7 \times 10^{-6}$ | $0.05 \times 10^{-6}$ |
| Comparative Dye A | $3.2 \times 10^{-6}$ | $1.4 \times 10^{-6}$ |
| Dye B | $2.1 \times 10^{-6}$ | $1.0 \times 10^{-6}$ |

It is obvious from Table 1 above that the dye of the present invention containing at least three sulfo groups in the molecule showed a far smaller coefficient of diffusion from a phase containing a basic polymer to a phase not containing such a polymer in comparison to known dyes A and B. In other words, it is obvious that the dye used in the present invention benefits far more greatly from the mordanting effect of the basic polymer incorporated than any known water-soluble dye similarly having an indolenine nucleus.

EXAMPLE 1

A fine grain monodisperse emulsion containing 99 mole % of silver bromide and 1.0 mole % of silver iodide was chemically sensitized with gold and sulfur to form a photographic emulsion. To this emulsion there were added $8\times 10^{-5}$ mole of Compound 1 per mole of the silver halide, 15 cc of saponine (10%) as a coating assistant, and 5 cc of 2,4-dichloro-6-hydroxy-1,3,5-triazine sodium salt (1%) as a hardening agent. The resulting composition was coated on a cellulose triacetate film to form a 2.0 μm thick layer, and the film was dried to form a Sample 2A. Likewise, Comparative Samples 2B and 2C were prepared by adding to the emulsion prepared above $8\times 10^{-5}$ mole of each of known dyes A and B used in the aforementioned experiments.

The photographic light-sensitive materials thus prepared were exposed by sensitometry, subjected to development at 27° C. for three minutes using a developing solution of the following composition, treated with the following fixing solution, washed with water, and dried.

| Developing Solution: | |
|---|---|
| N-methyl-p-aminophenol sulfate | 3 g |
| Hydroquinone | 12 g |
| Sodium Sulfite | 45 g |
| Sodium Carbonate | 70 g |
| Potassium Bromide | 2 g |
| Water to make | 1 l |
| Fixing Solution: | |
| Sodium Thiosulfate | 300 g |
| Sodium Sulfite | 15 g |
| Glacial Acetic Acid | 12 g |
| Potassium Alum | 20 g |
| Water to make | 1 l |

The results thus obtained are shown in Table 2 below, in which the values of sensitivity are the relative values assumed when the sensitivity of Sample 2B is 100. It is obvious from Table 2 that Sample 2A containing Example Dye 1 of the present invention underwent a smaller reduction in sensitivity than Comparative Samples 2B and 2C containing known dyes.

TABLE 2

| Sample No. | Photographic Properties | |
|---|---|---|
|  | Sensitivity | Fogging |
| 2A | 132 | 0.04 |
| 2B | 100 | 0.04 |
| 2C | 90 | 0.04 |

EXAMPLE 2

An aqueous solution containing gelatin and each of Compound 1 and known dyes A and B was prepared by adding $1.5\times 10^{-4}$ mole of each dye into a mixture consisting of 100 g of a 3% aqueous solution of gelatin and 0.2 g of poly (diethylaminoethyl methacrylate), followed by the addition thereinto of 4 cc of a 1% aqueous solution of 2,4-dichloro-6-hydroxy-1,3,5-triazine sodium salt and 4 cc of a 10% aqueous solution of saponine. The solution thus prepared was coated on a cellulose triacetate film and dried to form a 1.6 μm thick anti-halation layer thereon. The anti-halation layer was coated with a 1.7 μm thick layer of a panchromatically spectrally sensitized fine grain monodisperse silver iodobromide emulsion containing 1.0 mole % of silver iodide. A 0.5 μm thick protective layer of gelatin was coated on the emulsion layer to prepare a photographic light-sensitive material containing each sample dye.

The samples thus prepared, i.e., Sample 3A of the present invention containing Compound 1, Sample 3B containing known dye A and Sample 3C containing known dye B, were exposed, developed, fixed, washed with water, and dried as described in Example 1 above. The sensitivity and fogging of each sample were determined, and the results are shown in Table 3 below, in which the values of sensitivity are based on Sample 3B as 100.

TABLE 3

| Sample No. | Photographic Properties | |
|---|---|---|
|  | Sensitivity (Relative Values) | Fogging |
| 3A | 175 | 0.05 |
| 3B | 100 (basis) | 0.05 |
| 3C | 100 | 0.05 |

It is obvious from Table 3 above that Sample 3A of the present invention having an anti-halation layer containing the dye underwent a far smaller reduction in sensitivity due to the incorporation of the dye than Samples 3B and 3C containing known dyes.

EXAMPLE 3

An aqueous solution containing each of Compound 1 of the present invention and known dyes A and B was prepared by incorporating $1.0\times 10^{-4}$ mole of each dye as a magenta dye into a mixture consisting of 100 g of a 3% aqueous solution of gelatin and 0.2 g of poly(diethylaminoethyl methacrylate). Known yellow and cyan dyes C and D as shown below were added into each solution in order to provide an anti-halation property over the entire region of visible rays, followed by the addition of 4 cc of a 1% aqueous solution of 2,4-dichloro-6-hydroxy-1,3,5-triazine sodium salt and 4 cc of a 10% aqueous solution of saponine. The solution thus prepared was coated on a cellulose triacetate film to form a 1.6 μm thick anti-halation layer thereon. The anti-halation layer was then coated thereon with a 1.7 μm thick layer of a panchromatically spectrally sensitized fine grain monodisperse silver iodobromide emulsion containing 1.0 mole % of silver iodide. A 0.5 μm thick protective gelatin layer was coated on the emulsion layer to thereby a photographic light-sensitive material containing each magenta dye. The three samples thus prepared were designated as 4A, 4B and 4C according to the type of the magenta dye incorporated therein. These samples were exposed, developed, fixed, washed with water, and dried as described in Example 1.

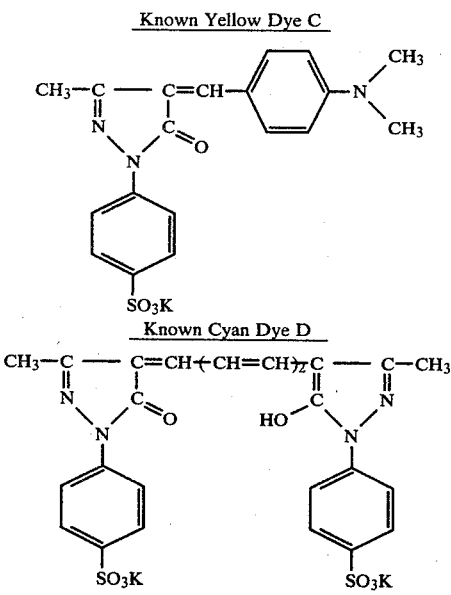

The sensitivity and fogging of each sample were determined and the results are shown in Table 4 below in which the values of sensitivity are based on the assumption that the sensitivity of Sample 4B was 100.

TABLE 4

| Sample No. | Photographic Properties | |
|---|---|---|
| | Sensitivity (Relative Values) | Fogging |
| 4A | 150 | 0.05 |
| 4B | 100 (basis) | 0.05 |
| 4C | 100 | 0.05 |

It is obvious from Table 4 above that Sample 4A having an anti-halation layer containing the dye according to the present invention underwent a smaller reduction in sensitivity due to the incorporation of the dye therein than Samples 4B and 4C containing known dyes A and B.

EXAMPLE 4

A cellulose acetate film having an undercoat applied thereon was coated with a 5 μm thick layer of a silver iodobromide emulsion (containing 6 mole % of silver iodide) rendered sensitive to light having a red color with anhydro 5,5'-dichloro-9-ethyl-3,3'-di(3-sulfopropyl)thiacarbocyanine hydroxide, and containing 2,4-dichloro-3-methyl-6-[(2,4-di-(tert)-amylphenoxy)acetamide]phenol as a cyan coupler. Then, the emulsion layer was coated with a 1.5 μm thick intermediate gelatin layer. The film thus prepared was divided into five sections, and each of those sections was coated with a 1.5 μm thick magenta filter layer containing one of the following solutions 5A to 5E. Each magenta filter layer showed an absorption density of 0.4 at the maximum absorption wavelength.

Solution 5A:

| | | |
|---|---|---|
| Aqueous solution of gelatin | 10% | 500 cc |
| Poly(2-diethylaminoethyl methacrylate) | 5% | 220 cc |
| Compound 1 | 10% | 40 cc |
| 2,4-Dichloro-6-hydroxy 1,3,5-triazinine Sodium salt | 1% | 25 cc |
| Dodecaethyleneglycol-4-nonyl-phenolether | 2% | 30 cc |

Solution 5B
Sample as 5A, except that the same quantity of Example Dye 5 was used instead of Compound 1.
Solution 5C:
Same as 5A, except that the same quantity of Comparative Dye A was used instead of Compound 1.
Solution 5D:
Same as 5A, except that the same quantity of Comparative Dye B was used instead of Compound 1.
Solution 5E:

| | | |
|---|---|---|
| Aqueous solution of gelatin | 8% | 500 cc |
| 2,4-Dichloro-6-hydroxy 1,3,5-triazine sodium salt | 1% | 25 cc |
| Dodecaethyleneglycol-4-nonylphenolether | 2% | 30 cc |

The film was then coated with a 4 μm thick layer of a silver iodobromide emulsion (containing 6 mole % of silver iodide) rendered sensitive to light having a green color with anhydro 9-ethyl-5,5'-diphenyl-3,3'-di(3-sulfopropyl) oxacarbocyanine hydroxide, and containing 1-(2,4,6-trichlorophenyl)-3-[3-{(2,4-di-tert-aminophenoxy)acetamide}benzamide]pyrazoline-5-one as a magenta color forming coupler. The emulsion layer was then coated thereon with a 2 μm thick yellow filter layer formed from a solution of the following composition:

| Solution for the Yellow Filter Layer: | | |
|---|---|---|
| Aqueous solution of gelatin containing 8 g of Carey-Lea type yellow colloidal silver | 6% | 500 g |
| 2,4-Dichloro-6-hydroxy-1,3,5-triazine sodium salt | 1% | 25 cc |
| Polyethyleneglycol-4-nonylphenolether | 2% | 30 cc |

The film was further coated on the yellow filter layer with a 5 μm thick layer of a blue-sensitive silver iodobromide emulsion containing 6 mole % of silver iodide, and α-(4-methoxybenzoyl)-2-chloro-5-[α-(2,4-di-tert-amylphenoxy)butylamide]acetanilide as a yellow color forming coupler, followed finally by the application of a 1 μm thick surface protective layer of gelatin.

The samples of light-sensitive materials thus prepared were designated as 5A to 5E according to the type of the magenta filter layer incorporated therein. Each of the samples was exposed to a light source of tungsten having a color temperature of 5,500° K for a period of 1/200 second through a light purple resolving filter Sp-1 and a continuous grey wedge, and treated as follows:

| Processing Step | Temperature | Time |
|---|---|---|
| 1. Color Development | 37.8° C. | 3.5 min. |
| 2. Water Washing | " | 1.0 min. |
| 3. Bleaching | " | 4.5 min. |
| 4. Water Washing | " | 1.0 min. |
| 5. Fixing | " | 6.0 min. |
| 6. Water Washing | " | 1.0 min. |
| 7. Stabilizing | " | 1.0 min. |

The processing solutions used each had the following composition:

| Color Developing Solution: | |
|---|---|
| Sodium Hydroxide | 2 g |
| Sodium Sulfite | 2 g |
| Potassium Bromide | 0.4 g |
| Sodium Chloride | 1 g |
| Borax | 4 g |
| Hydroxylamine Sulfate | 2 g |
| Tetrasodium Ethylenediaminetetraacetate | 2 g |
| 4-Amino-3-methyl-N-ethyl-N-($\beta$-hydroxyethyl) Aniline Sesquisulfate (monohydrate) | 4 g |
| Water to make | 1 l |
| Bleaching Solution: | |
| Sodium Ethylenediaminetetraacetate Iron (III) (dihydrate) | 100 g |
| Potassium Bromide | 50 g |
| Ammonium Nitrate | 50 g |
| Borax | 5 g |
| Water to make | 1 l |
| Fixing Solution: | |
| Sodium Thiosulfate | 150 g |
| Sodium Sulfite | 15 g |
| Borax | 12 g |
| Glacial Acetic Acid | 15 ml |
| Potassium Alum | 20 g |
| Water to make | 1 l |
| Stabilizing Solution: | |
| Borax | 5 g |
| Sodium Citrate | 5 g |
| Sodium Metaborate (tetrahydrate) | 3 g |
| Potassium Alum | 15 g |
| Water to make | 1 l |

A photographic characteristic curve was prepared for the magenta color image formed on each sample thus treated to obtain the amount of exposure required to provide a fogging density of 0.1, and the inverse number of the value obtained was adopted as indicating the value of sensitivity. The values of relative sensitivity thus determined for the samples and the presence of any stain thereon were as shown in Table 5 below.

TABLE 5

| Sample No. | Relative Magenta Sensitivity Images Exposed to Green Light | Stain |
|---|---|---|
| 5A | 95 | None |
| 5B | 96 | None |
| 5C | 70 | None |
| 5D | 65 | None |
| 5E | 100 (basis) | None |

As is obvious from the results shown in Table 5 above Samples 5A and 5B embodying the present invention had only negligible diffusion of the dye into the green-sensitive emulsion layer and showed a degree of sensitivity which was nearly equal to that of Control Sample 5E, while Comparative Samples 5C and 5D containing known dyes A and B underwent a considerable reduction in the sensitivity of the green-sensitive emulsion layer as compared with Control Sample 5E, due to the filter effect caused by the diffusion of the dye from the magenta filter layer to the green-sensitive emulsion layer.

While the invention has been described in detail and with reference to specific embodiments thereof, it will be apparent to one skilled in the art that various changes and modification can be made therein without departing from the spirit and scope thereof.

What is claimed is:

1. A photographic light-sensitive element comprising a support, at least one light-sensitive silver halide emulsion layer carried on said support and at least one hydrophilic colloidal layer carried on said support containing a basic polymer and at least one dye selected from the styryl and butadienyl dyes represented by the formula (I) each containing at least three sulfo groups in the molecule:

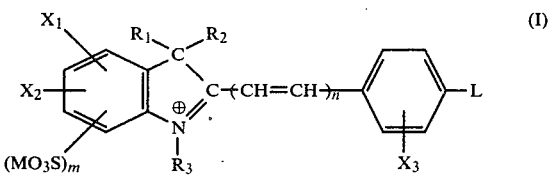

wherein $R_1$ and $R_2$ may be the same or different and represent an alkyl group; $R_3$ represents an unsubstituted or substituted alkyl or alkenyl group; L represent —O—Y—SO$_3$M or

in which $Z_1$ and $Z_2$ can be the same or different and represent a hydrogen atom, an unsubstituted or substituted alkyl group, an alkenyl group, an unsubstituted or substituted aryl group, an acyl group or —Y—SO$_3$M, Y represents an alkylene or alkenylene group, and M represents a hydrogen atom or a cation; $X_1$, $X_2$ and $X_3$ can be the same or different, and each represents a hydrogen atom, a halogen atom, an alkyl group, an alkoxy group, a hydroxy group, a carboxy group, a substituted amino group or an alkoxycarbonyl group; m is 0 or 1; and n is 1 or 2, there being present in said hydrophilic colloidal layer 1 to 5 equivalents of recurring units forming the polymer per equivalent of acid group in the at least one dye.

2. The photographic light-sensitive element of claim 1, wherein $R_1$ and $R_2$ each represents an alkyl group having 1 to 3 carbon atoms, and $R_3$ represents an alkyl group having 1 to 5 carbon atoms, a substituted alkyl group having a total of 1 to 6 carbon atoms, or an alkenyl group having 2 to 4 carbon atoms.

3. The photographic light-sensitive element of claim 2, wherein L represents —O—Y—SO$_3$M, wherein Y represents an alkylene group having 2 to 5 carbon atoms or an alkenylene group having 2 to 5 carbon atoms.

4. The photographic light-sensitive element of claim 2, wherein L represents

wherein $Z_1$ and $Z_2$ each represents a hydrogen atom, an alkyl or substituted alkyl group having 1 to 6 carbon atoms, an alkenyl group having 2 to 4 carbon atoms, a phenyl or substituted phenyl group, an acyl group derived from an aliphatic carboxylic or sulfonic acid having 1 to 4 carbon atoms, or $-Y-SO_3M$, wherein Y represents an alkylene group having 2 to 5 carbon atoms or an alkenylene group having 2 to 5 carbon atoms.

5. The photographic light-sensitive element of claim 3 or 4, wherein M represents a hydrogen atom, an ammonium group, an alkali metal cation, an alkaline earth metal cation or a cation derived from an organic base.

6. The photographic light-sensitive element of claim 5, wherein $X_1$, $X_2$ and $X_3$ each represent a hydrogen atom, a halogen atom, an alkyl group having 1 to 4 carbon atoms, an alkoxy group having 1 to 4 carbon atoms, a hydroxy group, a carboxy group, an amino group substituted with an acyl group derived from an aliphatic carboxylic or sulfonic acid having 1 to 4 carbon atoms, an alkylamino group having 1 to 4 carbon atoms, a dialkylamino group having 1 to 4 carbon atoms, or an alkoxycarbonyl group having 2 to 4 carbon atoms.

7. The photographic light-sensitive element of claim 6, wherein n is 1.

8. The photographic light-sensitive element of claim 7, wherein L or $X_3$ contains at least one sulfo group.

9. The photographic light-sensitive element of claim 8, wherein any of said sulfo groups is in the form of a salt.

10. The photographic light-sensitive element of claim 1, wherein M represents a cation.

11. The photographic light-sensitive element of claim 4, wherein at least one of $Z_1$ and $Z_2$ contains a sulfo group.

12. The photographic light-sensitive element of claim 11, wherein at least one of $Z_1$ and $Z_2$ is a sulfoalkyl group, a sulfoaralkyl group or a sulfoalkoxyalkyl group.

13. The photographic light-sensitive element of claim 1, wherein $R_3$ contains a sulfo group.

14. The photographic light-sensitive element of claim 13, wherein $R_3$ is a sulfoalkyl group.

15. The photographic light-sensitive element of claim 1, wherein said dye is present in an amount of about 8 to 800 mg dye per square meter of said material.

16. The photographic light-sensitive element of claim 3, wherein Y represents an alkylene group.

17. The photographic light-sensitive element of claim 1, wherein said hydrophilic colloid layer is positioned in said light-sensitive material as an antihalation layer.

18. The photographic light-sensitive element of claim 1, wherein said hydrophilic colloid layer is positioned in said light-sensitive material as a filter layer.

19. The photographic light-sensitive element of claim 1, wherein said basic polymer is a polymer obtained by polymerization of at least an ethylenically unsaturated monomer containing a dialkylaminoalkyl ester group.

20. The photographic light-sensitive element of claim 1, wherein said basic polymer is a basic and hydrophilic high polymer which contains a basic residue having a tertiary or quaternary nitrogen atom in its main or side chain.

21. The photographic light-sensitive element of claim 1, wherein $R_1$ and $R_2$ each represents an alkyl group having 1 to 5 carbon atoms, and $R_3$ represents an alkyl group having 1 to 6 carbon atoms, a substituted alkyl group having 1 to 8 carbon atoms or an alkenyl group having 2 to 5 carbon atoms.

* * * * *